US010466978B1

(12) United States Patent  
Vidan et al.

(10) Patent No.: US 10,466,978 B1  
(45) Date of Patent: Nov. 5, 2019

(54) INTELLIGENT ASSISTANT FOR AUTOMATING RECOMMENDATIONS FOR ANALYTICS PROGRAMS

(71) Applicant: Composable Analytics, Inc., Cambridge, MA (US)

(72) Inventors: Andy Vidan, Newton, MA (US); Lars Henry Fiedler, Lexington, MA (US)

(73) Assignee: Composable Analytics, Inc., Cambridge, MA (US)

( * ) Notice: Subject to any disclaimer, the term of this patent is extended or adjusted under 35 U.S.C. 154(b) by 0 days.

(21) Appl. No.: 15/410,725

(22) Filed: Jan. 19, 2017

Related U.S. Application Data

(60) Provisional application No. 62/428,211, filed on Nov. 30, 2016.

(51) Int. Cl.  
    *G06F 8/34*     (2018.01)  
    *G06N 20/00*     (2019.01)

(52) U.S. Cl.  
    CPC .............. *G06F 8/34* (2013.01); *G06N 20/00* (2019.01)

(58) Field of Classification Search  
    CPC ......... G06F 8/34; G06N 99/005; G06N 20/00  
    USPC ........................................................ 717/109  
    See application file for complete search history.

(56) References Cited

U.S. PATENT DOCUMENTS

| | | | | |
|---|---|---|---|---|
| 8,370,156 B1* | 2/2013 | Torgerson | ............. | G06F 17/504 704/1 |
| 9,489,630 B2 | 11/2016 | Achin | | |
| 9,678,628 B2* | 6/2017 | Gohr | ............ | G06F 3/0482 |
| 2009/0013309 A1* | 1/2009 | Shavlik | ............ | G06F 8/34 717/120 |
| 2011/0046766 A1* | 2/2011 | Mienhardt | ......... | G05B 19/4083 700/103 |
| 2014/0007060 A1* | 1/2014 | Warren | ............ | G06F 8/437 717/148 |
| 2014/0173563 A1* | 6/2014 | Dias | ............ | G06F 8/36 717/123 |
| 2014/0304429 A1* | 10/2014 | Softky | ............ | G06F 3/04842 710/8 |

(Continued)

OTHER PUBLICATIONS

Ayankoya et al, "Intrinsic Relations between Data Science, Big Data, Business Analytics and Datafication", [Online], 2014, pp. 192-198, [Retrieved from Internet on Jul. 23, 2019], <http://delivery.acm.org/10.1145/2670000/2664619/p192-ayankoya.pdf?ip=151.207.250.22&id=2664619&acc=ACTIVE%20SERVICE&key=C> (Year: 2014).*

(Continued)

*Primary Examiner* — Ziaul A Chowdhury  
*Assistant Examiner* — Zengpu Wei  
(74) *Attorney, Agent, or Firm* — Cambridge Technology Law LLC; David E. Boundy

(57) ABSTRACT

As a user uses a programming system to create programs, data are stored into a computer memory. The data describe actions of the user in creating the programs. The programming system has a user interface and a set of templates for functions. The user interface is designed to receive input from the user to direct the system to assemble functions from the set into the programs, the functions being functions for processing of data. As the user uses the user interface to assemble a program, suggestions to the user are computed, the suggestions recommending functions to be added into the program. The computation of function suggestion is based at least in part on the stored action data.

34 Claims, 13 Drawing Sheets

(56) References Cited

U.S. PATENT DOCUMENTS

| | | | | |
|---|---|---|---|---|
| 2015/0135166 | A1* | 5/2015 | Tarlow | G06F 8/34 717/125 |
| 2015/0331978 | A1* | 11/2015 | Englehart | G06F 17/5009 703/2 |
| 2016/0335327 | A1* | 11/2016 | Kanakadandi | G06N 20/00 |
| 2017/0091622 | A1* | 3/2017 | Taylor | G06F 17/18 |
| 2017/0116177 | A1* | 4/2017 | Walia | G06F 17/279 |
| 2017/0185581 | A1* | 6/2017 | Bojja | G06F 17/276 |
| 2017/0323215 | A1* | 11/2017 | Lada | G06N 20/00 |
| 2017/0337040 | A1* | 11/2017 | Salvi | G06F 8/34 |
| 2017/0371728 | A1* | 12/2017 | Allen | G06F 9/5011 |

OTHER PUBLICATIONS

Chong, et al, "Collaborative Analytics with Genetic Programming for Workflow Recommendation", [Online], 2013, pp. 657-662, [Retrieved from Internet on Jul. 23, 2019], <https://ieeexplore.ieee.org/stamp/stamp.jsp?tp=&arnumber=6721870> (Year: 2013).*

Chen et al, "Business Intelligence and Analytics: From Big Data to Big Impact", [Online], 2012, pp. 1165-1188 , [Retrieved from Internet on Jul. 23, 2019 <https://pdfs.semanticscholar.org/f5fe/b79e04b2e7b61d17a6df79a44faf358e60cd.pdf%3E.> (Year: 2012).*

Rabiner, A Tutorial on Hidden Markov Models and Selected Applications in Speech Recognition, Proceedings of the IEEE, vol. 77, No. 2, pp. 257-286 (Feb. 1989).

A. Stolcke, K. Ries, N. Coccaro, E. Shriberg, R. Bates, D. Jurafsky, P. Taylor, R. Martin, C. Van Ess-Dykema, & M. Meteer, Dialogue Act Modeling for Automatic Tagging and Recognition of Conversational Speech, Computational Linguistics 26(3), 339-373, AAAI Technical Report SS-98-01.

A. Stolcke, K. Ries, N. Coccaro, E. Shriberg, R. Bates, D. Jurafsky, P. Taylor, R. Martin, C. Van Ess-Dykema, & M. Meteer (2000), Dialogue Act Modeling for Automatic Tagging and Recognition of Conversational Speech, Computational Linguistics 26(3), 339-373.

Zoubin Ghahramani, An introduction to hidden Markov models and Bayesian networks, Int. J. Pattern Recognition and Artificial Intelligence, vol. 15 No. 9, pp. 9-42 (2001).

Kristy Elizabeth Boyer, Eun Young Ha, Robert Phillips, Michael Wallis, Mladen Vouk, James C. Lester, Inferring Tutorial Dialogue Structure with Hidden Markov Modeling, Inferring, Proceedings of the 4th Workshop on Innovative Use of NLP for Building Educational Applications (BEA), Boulder, Colorado, 2009, pp. 19-26.

L.H. Fiedler, T.J. Dasey, Systems and Methods for Composable Analytics, Massachusetts Institute of Technology, Lincoln Laboratory, Project Report CA-1 (Apr. 29, 2014), National Technical Information Service.

Kevin K. Nam, R. Taylor Locke, Sarah Yenson, Kimberlee Chang, Lars H. Fiedler, Advisory services for user composition tools, Proceedings of the 2015 IEEE 9th International Conference on Semantic Computing (IEEE ICSC 2015), pp. 9-16 (Feb. 7-9, 2015).

Mark Stamp, A Revealing Introduction to Hidden Markov Models (Dec. 11, 2015).

Florian Endel, Harald Piringer: Data Wrangling: Making data useful again, IFAC (Int'Federation of Automatic Control) (2015), https://doi.org/10.1016/j.ifacol.2015.05.197.

Trifacta, Whitepaper, The Opportunity for Data Wrangling in Financial Services and Insurance (probably Feb. 2016), available at https://www.trifacta.com/wp-content/uploads/2016/02/Trifacta-The-Opportunity-for-Data-Wrangling-in-Financial-Services-Insurance-White-Paper.pdf.

Trifacta, Whitepaper, The Opportunity for Data Wrangling in Life Sciences and Biopharmaceuticals (probably Feb. 2016), available at https://s26597.pcdn.co/wp-content/uploads/2016/02/Trifacta-The-Opportunity-for-Data-Wrangling-in-Life-Sciences-Biopharmaceuticals-White-Paper.pdf.

Trifacta, Whitepaper, The Opportunity for Data Wrangling in Telecommunications (probably Feb. 2016), available at https://www.trifacta.com/wp-content/uploads/2016/02/Trifacta-The-Opportunity-for-Data-Wrangling-in-Financial-Services-Insurance-White-Paper.pdf.

Joe Hellerstein, Trifacta, Introducing the Photon Compute Framework (Mar. 29, 2016), available at https://www.trifacta.com/blog/introducing-the-photon-compute-framework.

Trifacta, Why Trifacta (Apr. 4, 2016), available at https://web.archive.org/web/20160505193731/https://www.trifacta.com/products/why-trifacta/.

Trifacta, Best Practices for Executing New Analytics Initiatives (probably Jul. 2016), avaialbel at https://www.trifacta.com/wp-content/uploads/2016/07/TRI-Best-Practices-for-Executing-New-Analytics-Initiatives.pdf.

Trifacta, Whitepaper, Trifacta Data Wrangling for Hadoop: Accelerating Business Adoption While Ensuring Security & Governance (probably Jan. 2017), available at https://s26597.pcdn.co/wp-content/uploads/2017/01/Trifacta-White-Paper-Accelerating-Adoption-Ensuring-Governance-3.pdf.

* cited by examiner

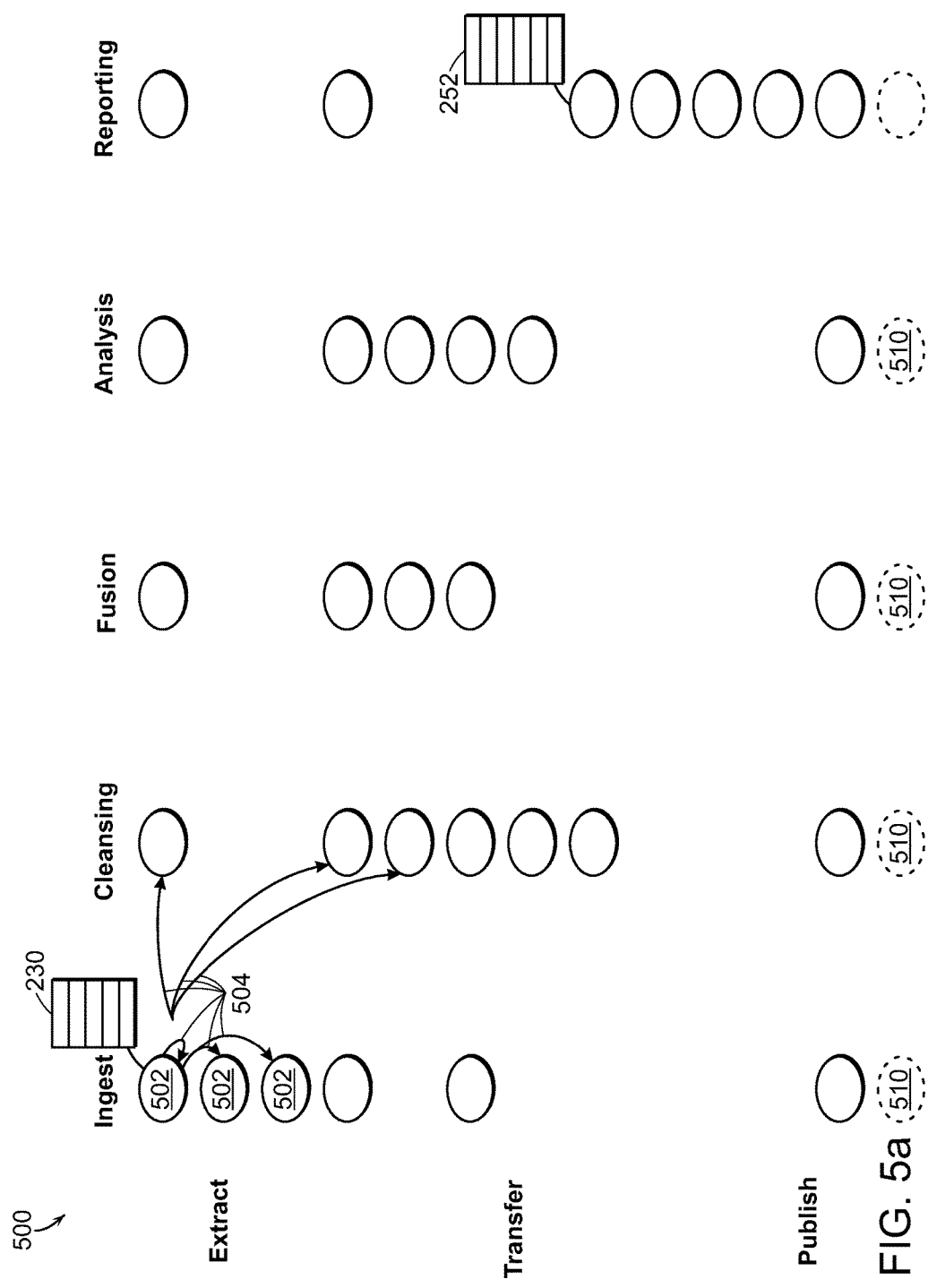

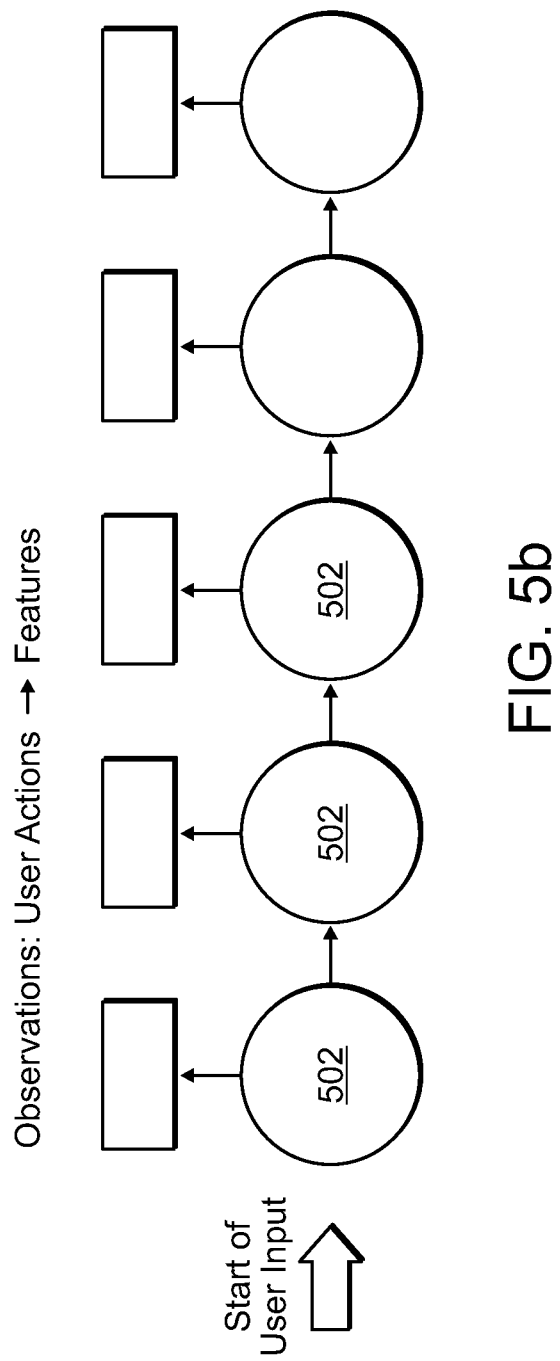

INTELLIGENT ASSISTANT FOR AUTOMATING RECOMMENDATIONS FOR ANALYTICS PROGRAMS

BACKGROUND

This application relates to software program development tools for code generation.

This application is a non-provisional of U.S. Provisional App. Ser. No. 62/428,211, filed Nov. 30, 2016, which is incorporated herein by reference.

Known programming systems present the user with a set of functional block templates, and tools for connecting those blocks together to form programs. The programs are called "analytical workflows."

SUMMARY

In general, in a first aspect, the invention features a method for easing programming of a computer, and a computer programmed to execute the method. A user uses a computer system with a set of functions and a user interface. The functions are functions for processing of data and for composition by a user into programs. The user interface is designed to receive input from a user to direct the system to compose functions from the set into a program. A computer processor stores into a computer memory actions of the user as the user instructs the system through the user interface to compose functions from the set of functions into programs that invoke the functions. As the user uses the user interface to assemble a program, the computer recommends to the user functions to be added into the program, based at least on the stored actions.

In general, in a second aspect, the invention features a method, a computer programmed to perform the method, and a nontransitory memory storing programs for performance of the method. As a user uses a programming system to create programs, data are stored into a computer memory. The data describe actions of the user in creating the programs. The programming system has a user interface and a set of templates for functions. The user interface is designed to receive input from the user to direct the system to assemble functions from the set into the programs, the functions being functions for processing of data. As the user uses the user interface to assemble a program, suggestions to the user are computed, the suggestions recommending functions to be added into the program. The computation of function suggestion is based at least in part on the stored action data.

Embodiments may include one or more of the following features. As the user uses the user interface to assemble a program, suggestions to the user may be computed to recommend data flow paths to be added to connect an output of one function to an input of another function. The computation of data flow suggestions may be based at least in part on the recorded actions. Function suggestions may be computed based at least in part on a model automatically generated by a machine learning algorithm, such as a Markov model or an n-gram model. The machine learning algorithm may be trained via programs built by multiple users. The function templates may specify inputs and outputs, the inputs and outputs being strongly typed. The function suggestions may be based at least in part on the types of inputs and/or outputs of the functions in the program. The function templates may be classified into phases, the phases corresponding to sequential operational phases of programs, the suggestions being based at least in part on the respective phase classifications. The user interface may be a graphical user interface designed to show the program's functions as blocks. As the user assembles functions from the set into a program, a partially-assembled program may be executed on input data; and suggestions to the user for functions to be added into the program may be computed based at least in part on the execution of the partially-assembled program.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION OF THE DRAWINGS

FIG. 5a is a state diagram of a Markov model.

FIG. 5b is a diagram of execution of a Markov model.

DESCRIPTION

Figure 1A:
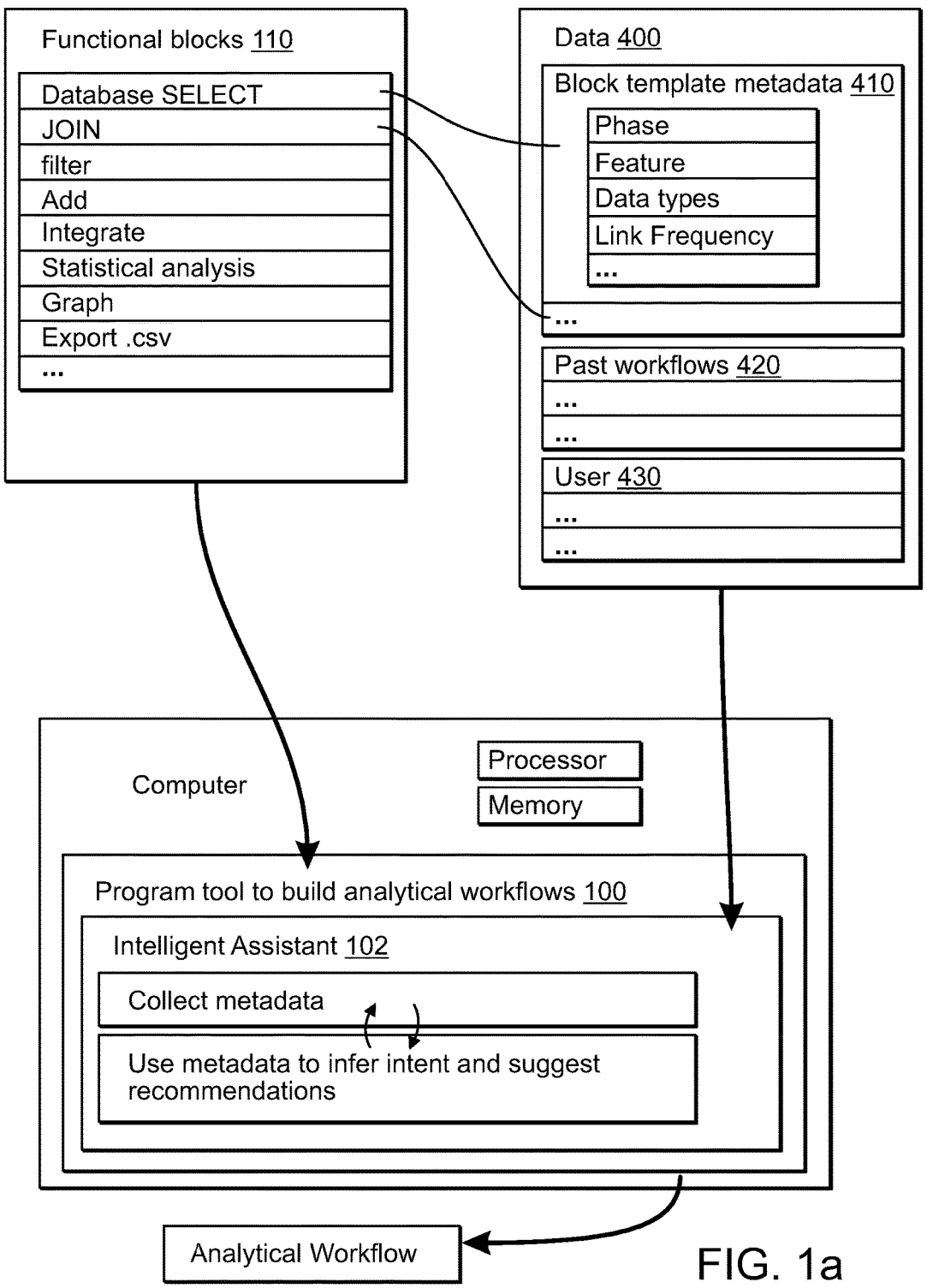
FIG. 1a is a block diagram of a programming system.

The Description is organized as follows.
I. Overview
II. User perspective—an example walkthrough
III. Information used to formulate predictions
III.A. Classifying block templates by phase
III.B. Classifying block templates by feature
III.C. Historical metadata about user behavior and past analytical workflows
IV. Prediction using Markov models
IV.A. Example Markov model
IV.B. Learn sequences and derive patterns
IV.C. Computational Framework
IV.D. Alternative approaches
V. Hardware implementation I. Overview Referring to FIGS. 1a and 1b, in a programming system 100 for analytical workflows provides a library 110 of templates for functional blocks 112. Each block template 112 specifies a functional block, with its function, inputs and outputs, and other properties. The graphical user interface allows a user to select block templates 112, instantiates selected templates as specific functional blocks 212, and allows the user to connect outputs from one block 212 as inputs to the next. Intelligent assistant 102 helps to build analytical workflows by recommending a short list of suggested next actions to the user, so that the user need not sift through the large library 110 for the next action to be taken. Intelligent assistant 102 may collect information from a number of sources, including annotation information describing the available block templates 112, information derived from and about previously built analytical workflows, information about this user, and information about other users and their use of the system. Intelligent assistant 102 may process this information to build a historical profile for each specific user that records what that user has done in the past. When the user uses the programming system 100 to build a new analytical workflow, intelligent assistant 102 may call on this learned data to infer what the user is likely to want to do next, and use that inference to recommend next actions to the user. Because the full set of available block templates 112 may be very large, singling out a set of more-probable recommendations tends to save time for a user, by relieving the user of the burden of scrolling through a large menu 110 of block templates 112. Likewise, intelligent assistant 102 may assist by recommending specific edges to the graph, to connect the blocks.

"Big data" is of limited utility without programs to integrate data (often from numerous and often disparate data sources, sometimes in various formats and structures), analyze the data, and extract patterns and synthesize useful information. Often information from multiple sources must be collected and correlated. A user data analyst typically mines, filters, pivots, and exploits data to extract insights (e.g., actionable insights that improve business processes). A program for ingesting and analyzing data, and presenting an output, may be called an "analytical workflow."

Programming system 100 may accelerate the process of developing analytical workflows by providing a scripting language and/or a visual approach for assembling and connecting functional blocks. One such system, called Composable Analytics from Composable Analytics, Inc. of Cambridge, Mass., is a web-based tool that allows users to author complex data analytic workflows using a visual approach and a flow-based programming methodology. Programming system 100 may provide a library 110 of block templates 112 or modules. Each block template 112 is analogous to a function in a traditional programming language: each function may have zero or more inputs, may perform some execution step such as computing some function of its inputs, and produce one or more outputs. Programming system 100 may assist a user in selecting block templates 112 to instantiate as functional blocks 212, and connecting outputs of one functional block 212 as inputs to other functional blocks 212. Programming system 100 may assist a user in building an analytical workflow represented as a flow-based diagram, for example, a directed graph with functional blocks as the nodes. The connections between functional blocks may be shown as data flow edges. Each functional block may perform one or more of the tasks required for the analytical workflow, from ingestion of data, to data preparation, to fusion of data from incompatible sources, to advanced analytical functions that facilitate exploitation of data. A completed analytical workflow may step through the entire process of performing the extraction, transformation, loading, querying, visualization, and dissemination of the data.

Intelligent assistant 102 may make automated recommendations to accelerate the development of correct analytical workflows. The technology does not require any specific programming system (e.g., Composable Analytics), but can be used in a variety of programming systems that work with functions and flow between them, whether represented as data flow graphs or similar graphical representations of programs, text, or other program representations.

II. User Perspective—an Example Walkthrough

Figure 1B:
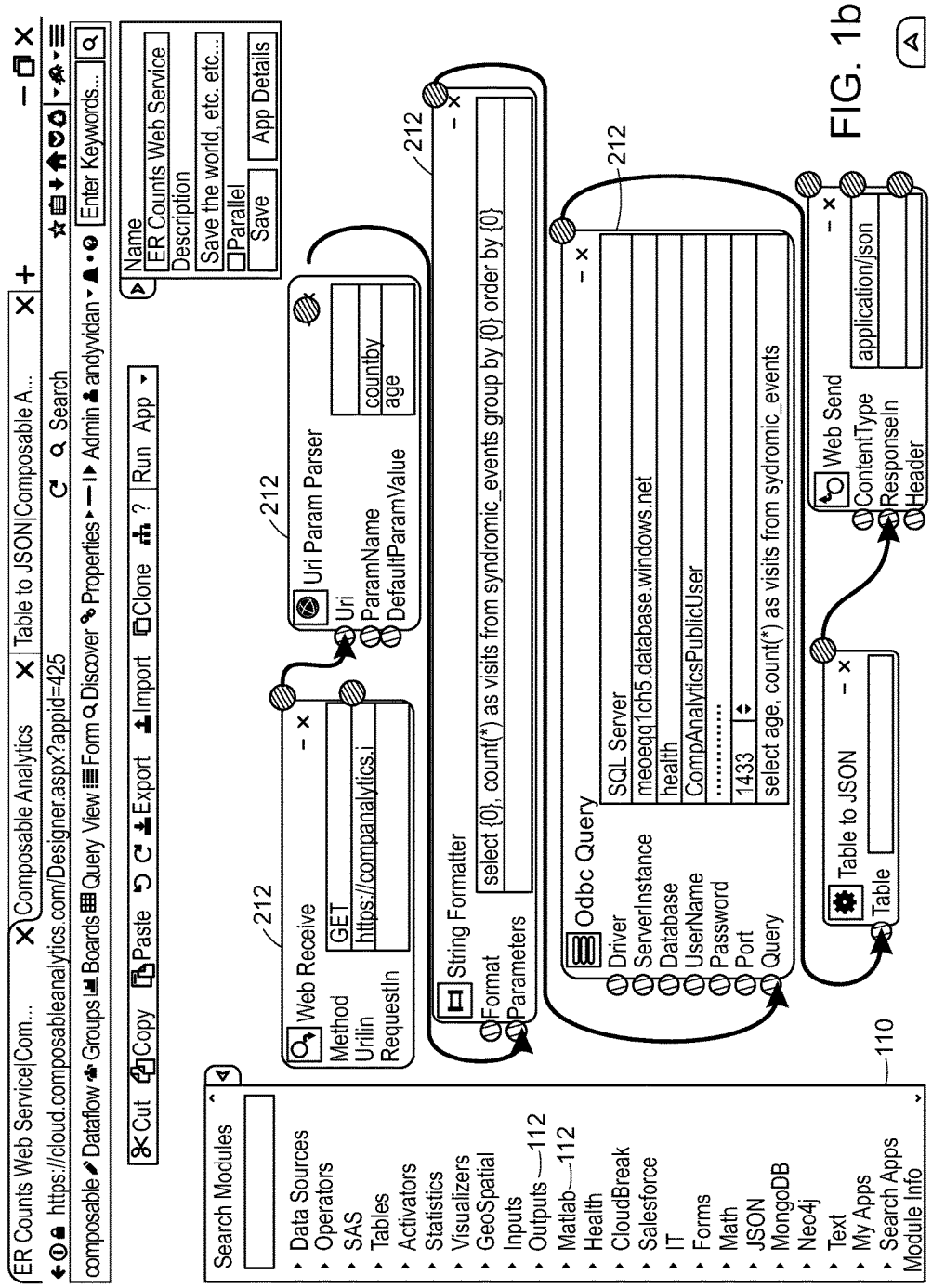
FIGS. 1b and 2a-2g are screen shots of a computer program in operation.
Figure 2A:
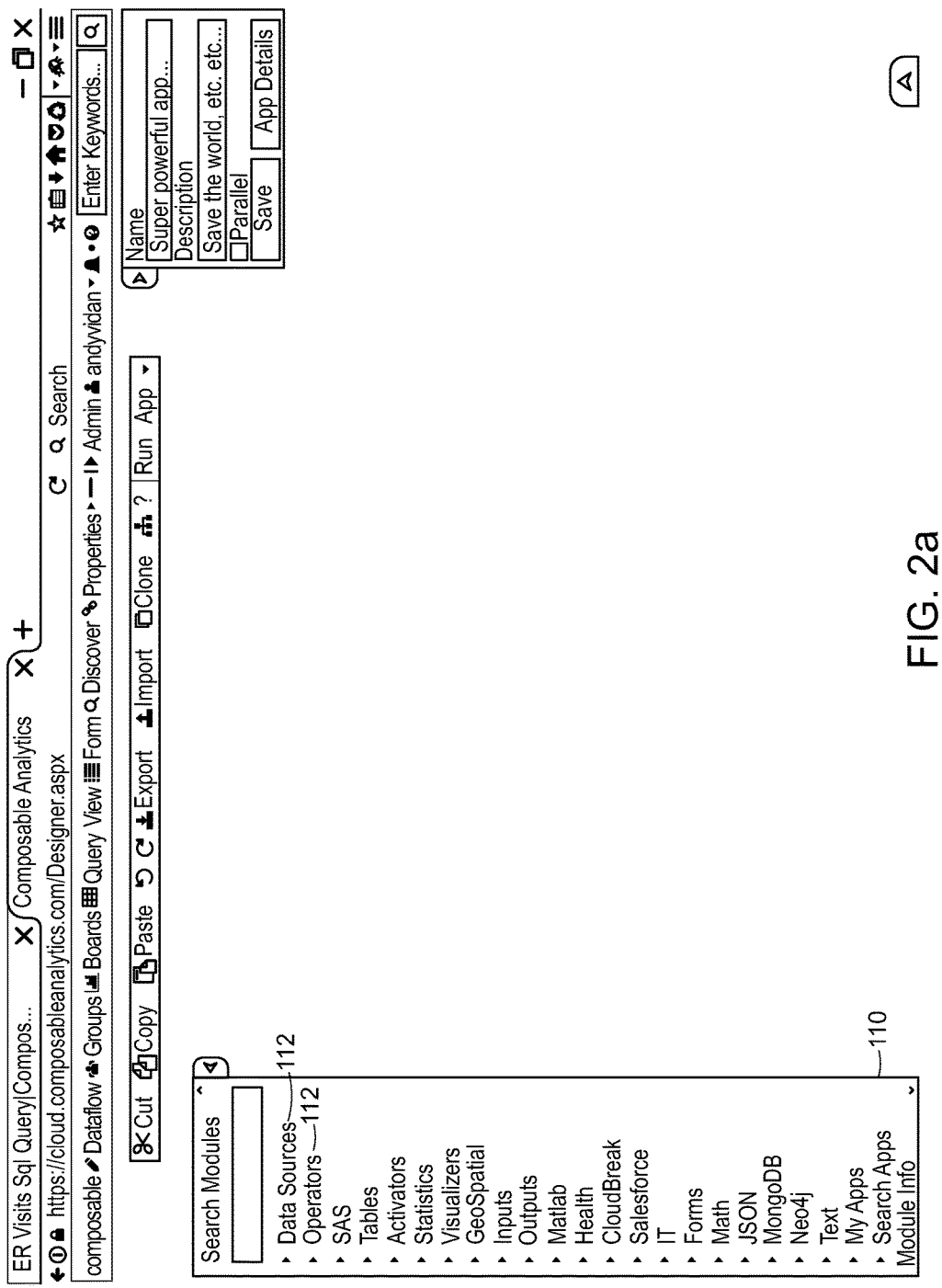

Referring to FIGS. 1a and 2a, a user may begin to create a new analytical workflow with a "blank canvas." A screen may show a library 110 or repository of available block templates 112, and a blank workspace waiting for the user to begin working. In a script-based system, the display may begin with an empty text file.

Repository 110 of block templates 112 may have many (tens, hundreds, or more than a thousand) block templates 112 that may be combined into a new analytical workflow.

Figure 2B:
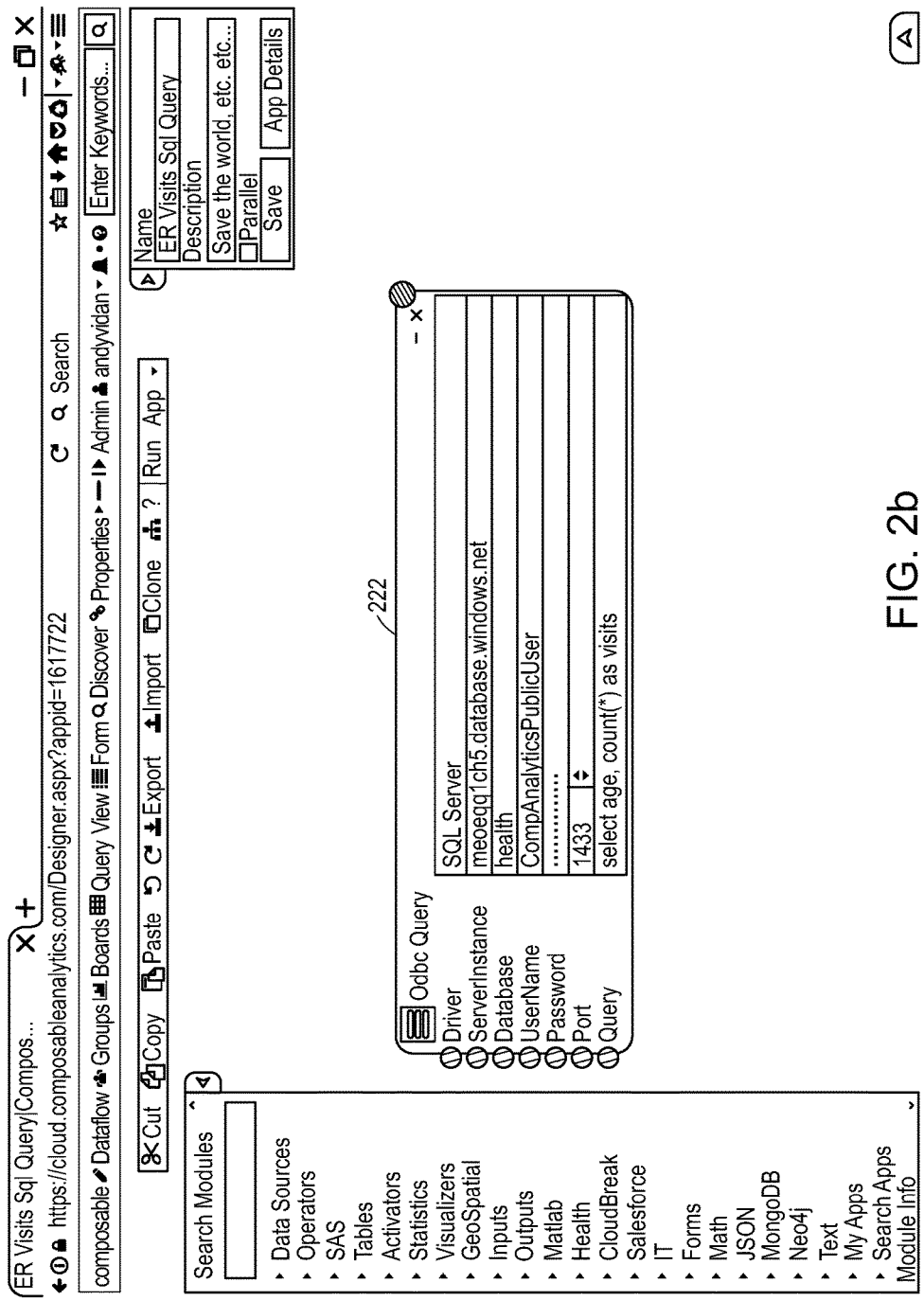

Referring to FIG. 2b, in the process of building an analytical workflow, as the user begins to select each new block template 112 to instantiate a functional block into the analytical workflow, intelligent assistant 102 uses available data 400 (described in section III) to automatically recommend one or more block templates 112, or connections from the output of one block to the input of another, that are highest probability to be of interest to the user, and offers them for selection. In the case of FIG. 2b, with a blank canvas, intelligent assistant 102 may not have enough information to offer a recommendation. Thus, this user may select a block template 112 without assistance. Alternatively, intelligent assistant 102 may predict that the user is most probable to begin with a Data Ingestion block (see the discussion of "phases" in section III.A, below), and may suggest a filtered list of block templates 112 to select, e.g., recommend only the block templates 112 that have functional block metadata showing they belong to the data ingestion phase. In either event, in FIG. 2b, the user has selected "ODBC Database Query Functional block" 222 to ingest data from a database.

Figure 2C:
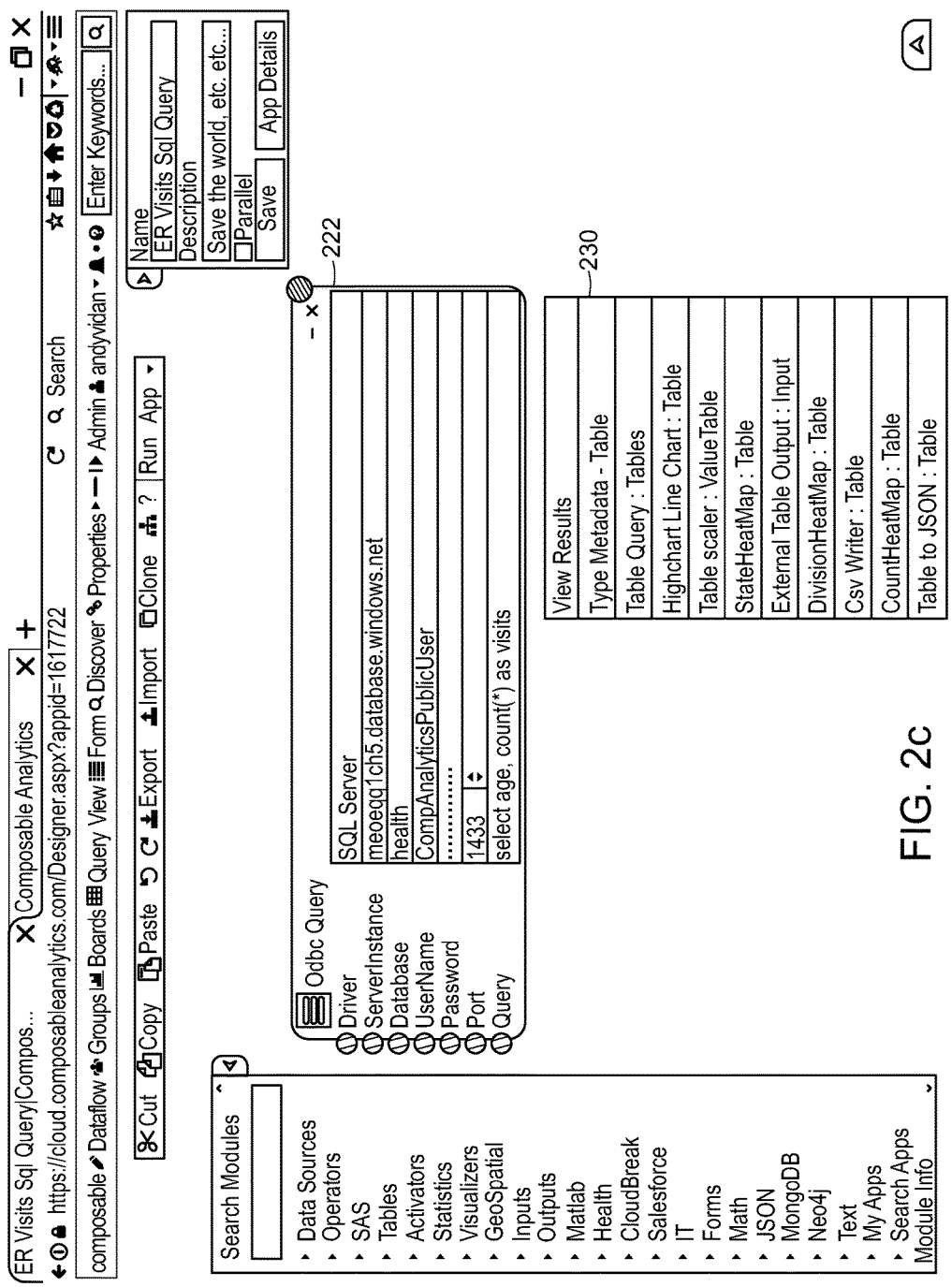

Referring to FIG. 2c, at this point, intelligent assistant 102 may provide recommendations on how to continue the build of the analytical workflow. In this case, because the first selection was "ODBC Database Query Functional block" 222 with a known output type of "Table", intelligent assistant 102 recommends a set 230 of block templates 112 that most likely continues the analytical workflow (e.g., functional blocks that take a table as input, and analyze, transform, or publish the table). Importantly, since the output of "ODBC Database Query Functional block" 222 is of type "Table," intelligent assistant 102 infers that the highest-probability next block template 112 is chosen from among block templates 112 that have an input for an object of type "Table." Based on data 400 collected from the user's past interactions and past interactions of other users (e.g., past analytical workflows that predominately dealt with similar ingested data—for example, from the same ODBC database, from social media feeds, environmental monitoring data, electoral demographic data, or whatever the user chose to begin with), intelligent assistant 102 may further refine its suggestion based on its understanding of that past activity to recommend data ingestion block templates 112 that ingest data from a specific source or with a specific structure (e.g., ingest social media content from Twitter). In FIG. 2c, from potentially hundreds of block templates 112 available in repository 110, intelligent assistant 102 may recommended a short list 230 of eleven block templates 112 and/or possible connections among existing functional blocks.

The user is not restricted to choosing from only the short list 230, but may select from the full palette 110 of available block templates 112, or menu 230 may have an "expand" entry (that might open up the recommendations to a second level), or a "break out" that presents the full palette.

Figure 2D:
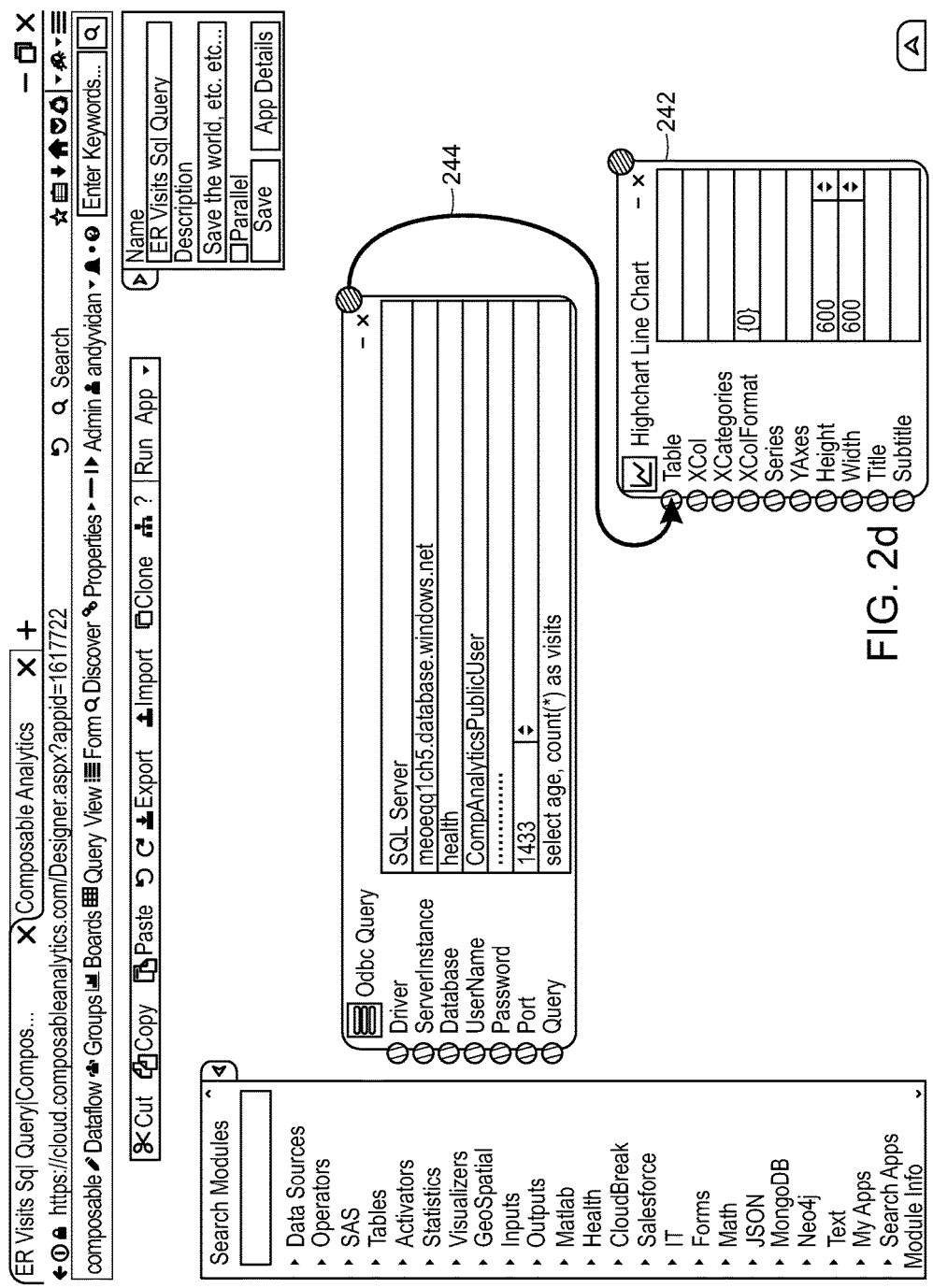

Referring to FIG. 2d, from among the short list of recommendations 230, the user may select "Highchart Line Chart" 242 to create a line graph of the output (e.g., "publish"). The system may place a "Highchart Line Chart" block 242 on the user's screen. System 100 may then automatically connect 244 the table output of the ODBC block to the table input of the Highchart Line Chart functional block 242.

Figure 2E:
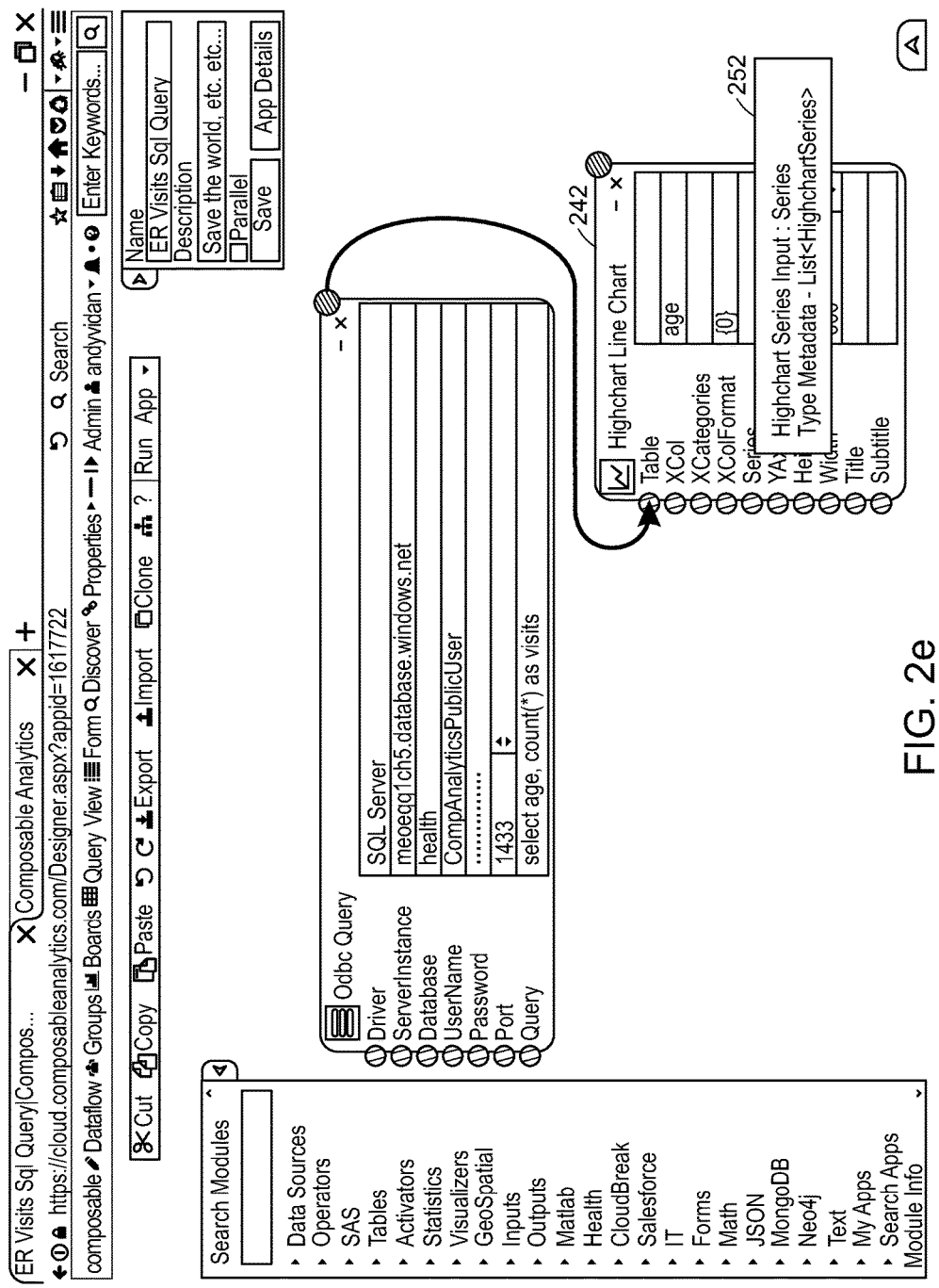

Referring to FIG. 2e, "Highchart Line Chart" functional block 242 has an input of data type "Series." As the user fills out the input parameters to the new "Highchart Line Chart" functional block 242, intelligent assistant 102 may suggest 252 two possible inputs that might supply input of data type "Series" for one of the inputs to the "Highchart Line Chart" functional block.

Figure 2F:
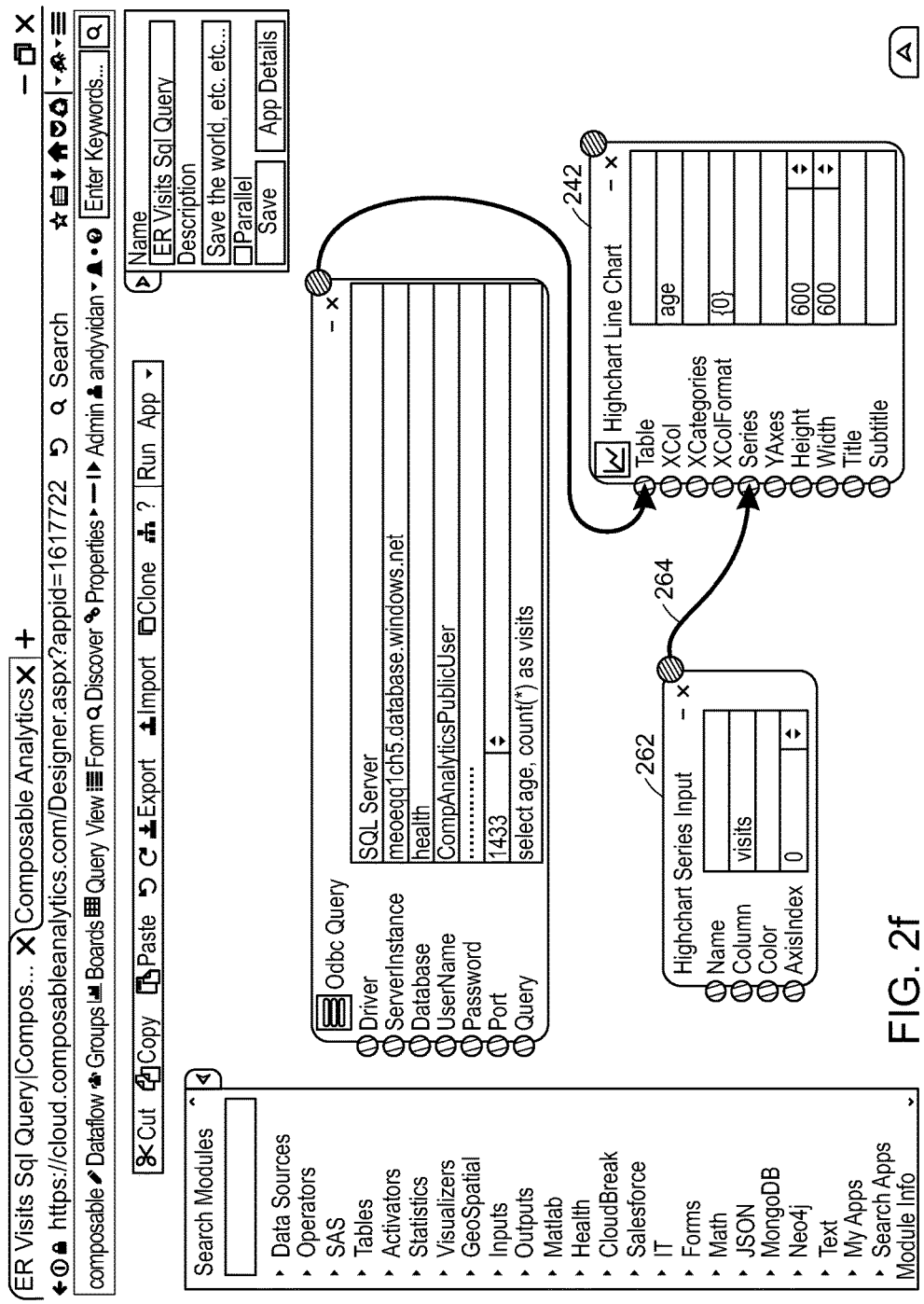

Referring to FIG. 2*f*, when the user accepts the recommendation by selecting from short list menu 252, the programming system creates the selected functional block 262, and connects 264 the "Series" output of that new block to the "Series" input of Highchart Line Chart functional block 242.

Figure 2G:
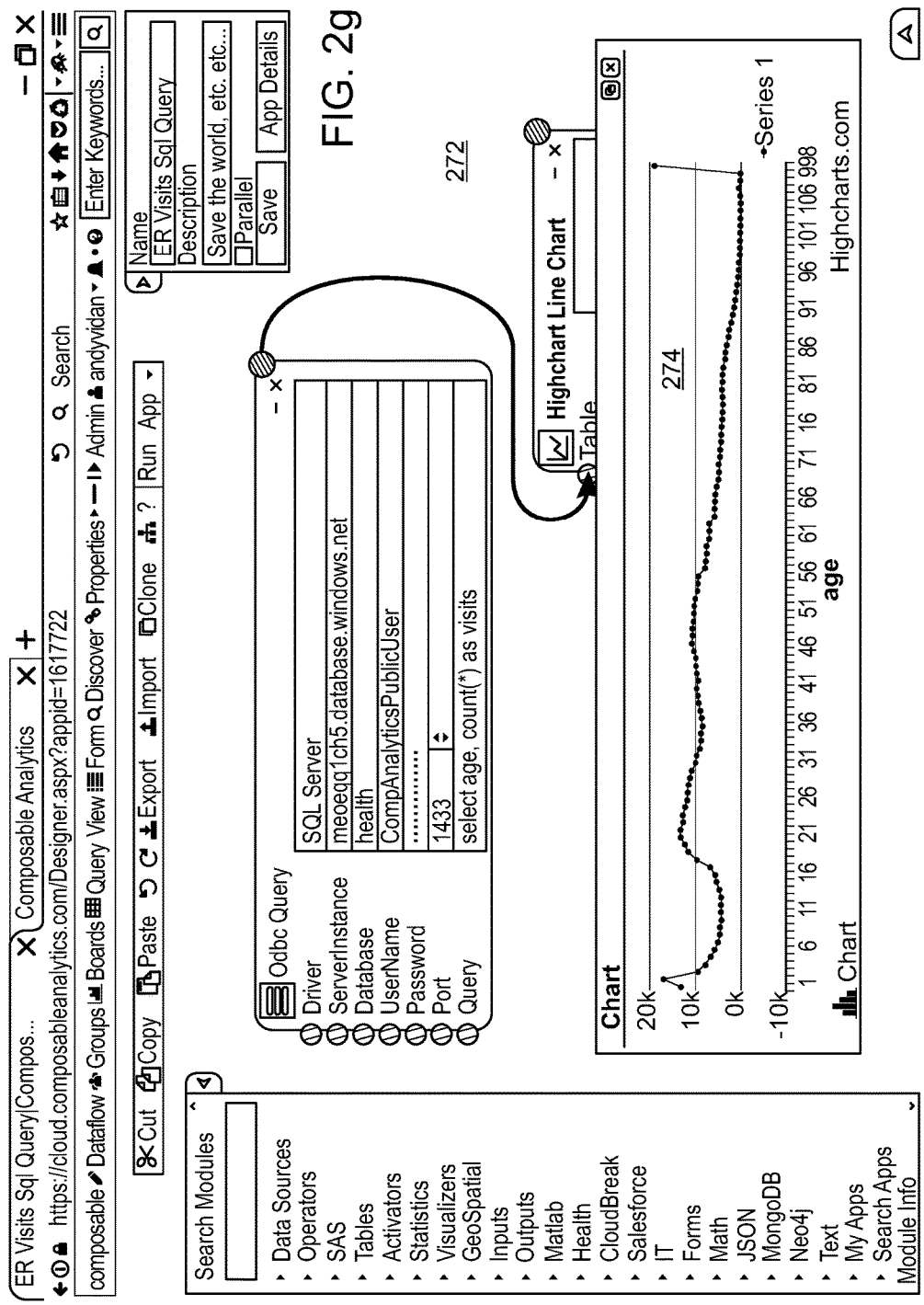

Referring to FIG. 2*g*, the process of recommending actions, and the user accepting or rejecting the recommendations to continue building the analytical workflow, continues across all phases until the user has completed building the full analytical workflow 272. Intelligent assistant 102 stores metadata describing the complete analytical workflow and the process by which the user built it, in form useable for future recommendations.

The user may run the workflow, and the system will plot a chart 274 as its output.

III. Information Used to Formulate Predictions

Referring again to FIG. 1*b*, an analytical workflow may grow to many functional blocks 212. The library 110 of block templates 112 may be segmented and grouped in order to allow better recommendations. Two possible segmentation approaches are described in sections III.A and III.B.

III.A. Classifying Block Templates by Phase

Figure 3:
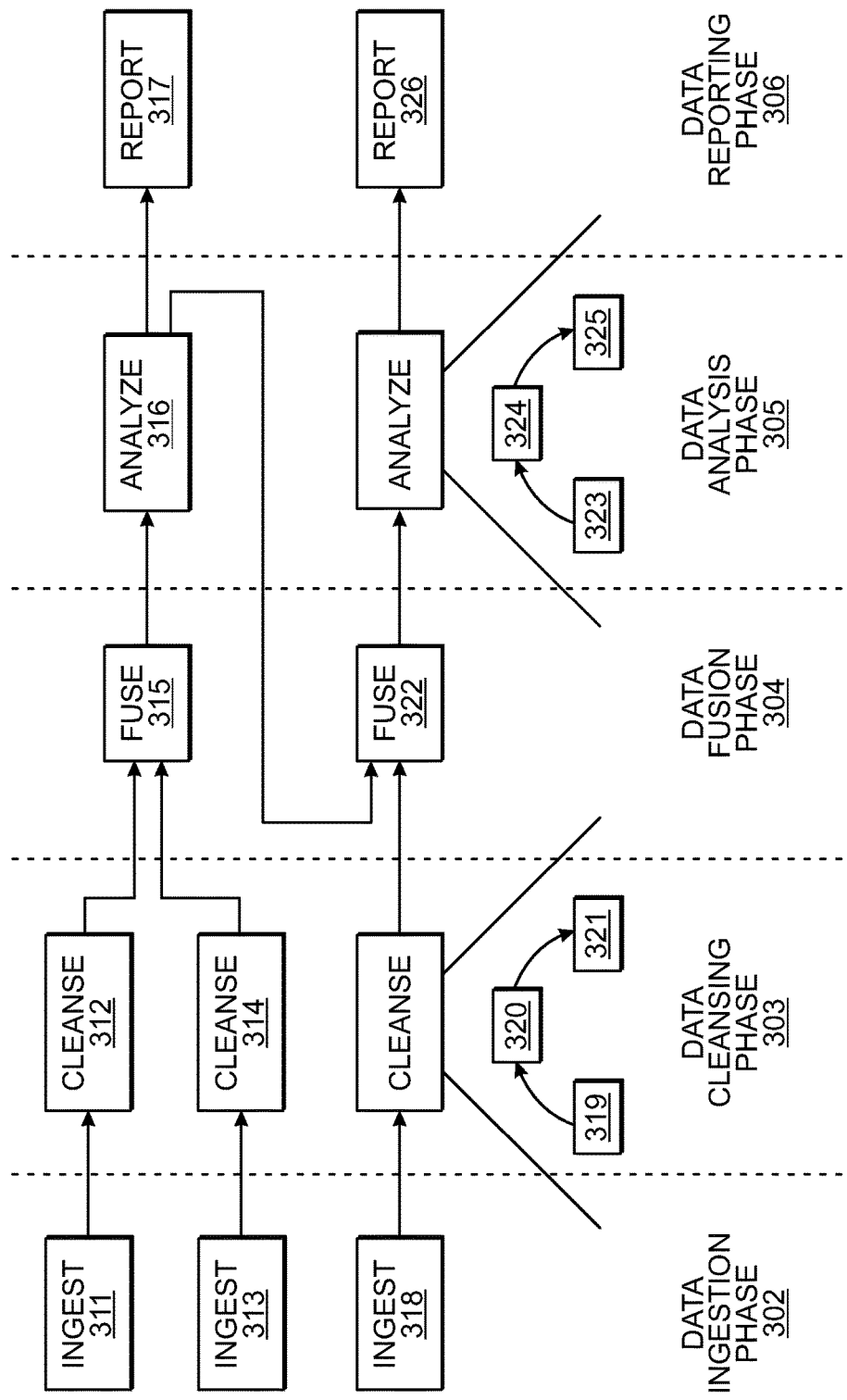
FIG. 3 is a block diagram of functions composed into a program.

Referring to FIG. 3, intelligent assistant 102 may divide an analytical workflow into phases 302, 303, 304, 305, 306, and classify block templates 112 based on the typical phase use. These phases are high-level steps in the workflow and can be envisioned as a list of steps followed through for each data source in the workflow. Not all phases may be present in any analytical workflow. Dividing an analytical workflow into phases may provide two advantages: (a) knowledge of the user's current phase helps in prediction, in narrowing down the range of choices to be presented in the short list of recommendations, and (b) subdividing the problem reduces computational load, especially for parts of the computation that have complexity order that calls for greater-than-linear growth. Intelligent assistant 102 may divide block templates 112, and resulting analytical workflows, into the following phases:

1. Data Ingestion phase 302 (including consumption of a source of data)
2. Data Cleansing phase 303 (including filtering, preparation, sanitization, converting disparate representations from different sources into a common representation, etc.)
3. Data Fusion phase 304 (e.g., joining data sets)
4. Data Analysis 305 (Analytics)
5. Data Reporting 306 (including visualization, report generations, etc.)

Likewise, the process of building an analytical workflow may be divided into phases—that is, programming system 100 may itself be in one phase or another, and intelligent assistant 102 may infer the current phase of building the workflow, and raise the probability of block templates 112 based on that inferred phase.

In the example of FIG. 3, the analytical workflow has the following functional blocks in the following phases:

There are three parallel paths that join to produce an output

On the top path:
  Data Ingestion phase has a single block, block 311
  Data Cleansing phase has a single block, block 312

On the second path
  Data Ingestion phase has a single block, block 313
  Data Cleansing phase has a single block, block 314

The top and second paths have a Data Fusion phase at block 315

The top path continues with
  a Data Analysis phase, having a single block 316
  a Data Reporting phase, having a single block 317

On the third path
  Data Ingestion phase has a single block, block 318
  Data Cleansing phase has three blocks, blocks 319, 320, 321

The two remaining paths join in a Data Fusion phase at block 322

The single consolidate path continues with a
  a Data Analysis phase, having a three blocks 323, 324, 325
  a Data Reporting phase, having a single block 326

A user builds an analytical workflow by selecting block templates 112 and connecting functional blocks (for example, blocks 319, 320, 321). A collection of user actions (e.g., selecting and connecting 319, 320, 321) forms a phase (e.g., Data Cleansing 303). A user will generally build a workflow from left to right, as shown in the series of steps, but may choose to work in a "non-linear" manner or make the analytical workflow include as many phases as desired, in any manner. Analytical Workflows may form a directed graph, with functional blocks at the nodes. The graph may have control flow and data flow loops.

Phase information may be used in creating recommendations. For example, after a user selects a Data Ingestion functional block 302, intelligent assistant 102 may store that selection into the user-action metadata 400, and from that metadata, infer that the phase is now Data Cleansing 303. While in Data Cleansing phase 303, intelligent assistant 102 may recommend Data Cleansing block templates 112. Similarly, after a user selects a Data Fusion functional block with one or more of its inputs not connected, intelligent assistant 102 may predict that the next functional block is likely another Data Ingestion 302 functional block. If all inputs of a Data Fusion 304 block are connected, intelligent assistant 102 may predict that the next block template 112 is likely to be a Data Analysis 305 functional block.

Because sometimes a user may not work in sequential left-to-right order (e.g., a user may start with a data ingestion 302 functional block and skip straight to a data reporting 306 functional block, for example, to generate a final XLS report, or may start in the middle with analysis blocks 305 and then later tack data ingest blocks 302 on from the left), intelligent assistant 102 performs phase segmentation in order to infer the control flow and suggest the intermediary functional blocks.

III.B. Classifying Block Templates by Feature

User actions and the available block templates 112 and actions available to the user may be tagged with a "feature" attribute to assist in grouping for prediction. The features may relate to a combination of an action and type of result of the functional block, or other characteristics of each functional block, for example:

a tuple of (Verb, data type of result)—for example (Extract, Table), (Publish, CSV), etc.
  a tuple of (output type, input type) for edge connections—for example (Table, Table), (Table, CSV), etc.
  a tuple of (function, data type of input), for expected functional processing on a data set—for example, (Kalman filter, time series), (Word Parser, string)

For example, block templates 112 that query databases and result in a table output are tagged as "Extract Table." To keep the computational complexity low, and not suffer from any overfitting issues, the features of the set may each be broad sets of actions, for example, three features may be Extract, Transform, and Publish. For example, a feature set of these three features can be defined as follows:

| Feature | Actual User Action Mapped to a Feature |
| --- | --- |
| Extract | Selecting a "ODBC database Query" block template |
| | . . . |
| Transform | Selecting a "Transpose Table Columns" block template |
| | . . . |
| Publish | Selecting "Export as XLS" block template |
| | . . . |
| | . . . |

More granular feature sets can be used as well. For example:

| Feature | Actual User Action Mapped to a Feature |
| --- | --- |
| Extract Table | Selecting a "ODBC database Query" block template |
| Extract XML | Selecting an "XML-Input Ingestor" block template |
| . . . | . . . |
| Transform Table | Selecting a "Transpose Table Columns" block template |
| . . . | . . . |
| Publish XLS | Selecting "Export as XLS" block template |
| Publish Web Service | Selecting "Publish as a Web Service" block template |
| . . . | . . . |
| Transform String to String | Connecting a string output from one functional block to a string input of another functional block |
| . . . | . . . |
| Extract Time Data | Executing Kalman Filter functional block on a time series |
| . . . | . . . |

This is a many-to-one mapping of available user-actions (both selection of block templates 112 to instantiate as functional blocks 212 and addition of edges between the blocks) to a specific feature, and a careful balance (e.g., computational complexity vs. overfitting) should be sought.

By combining the phase classification of section III.A (illustrated in FIG. 3A) with the feature tagging of this section III.B, the total computational complexity of choosing among all possible block templates 112 may be reduced because the total imput space may be reduced: solving for five smaller Markov models is less compute-bound than solving for a single large Markov model. Similarly, by combining the two classification schemes, the accuracy of predictions by intelligent assistant 102 may be improved.

III.C. Historical Metadata about User Behavior and Past Analytical Workflows

Figure 4A:
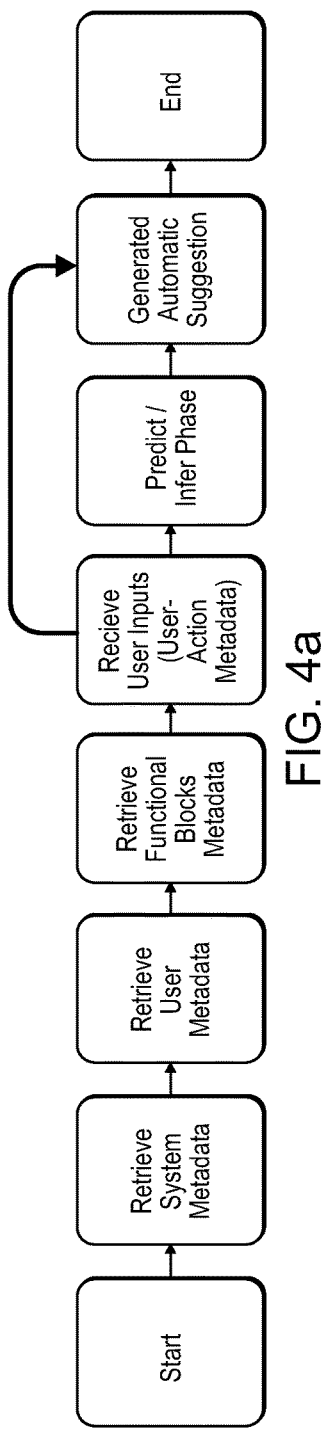
FIG. 4a is a block diagram of flow through a program.
Figure 4B:
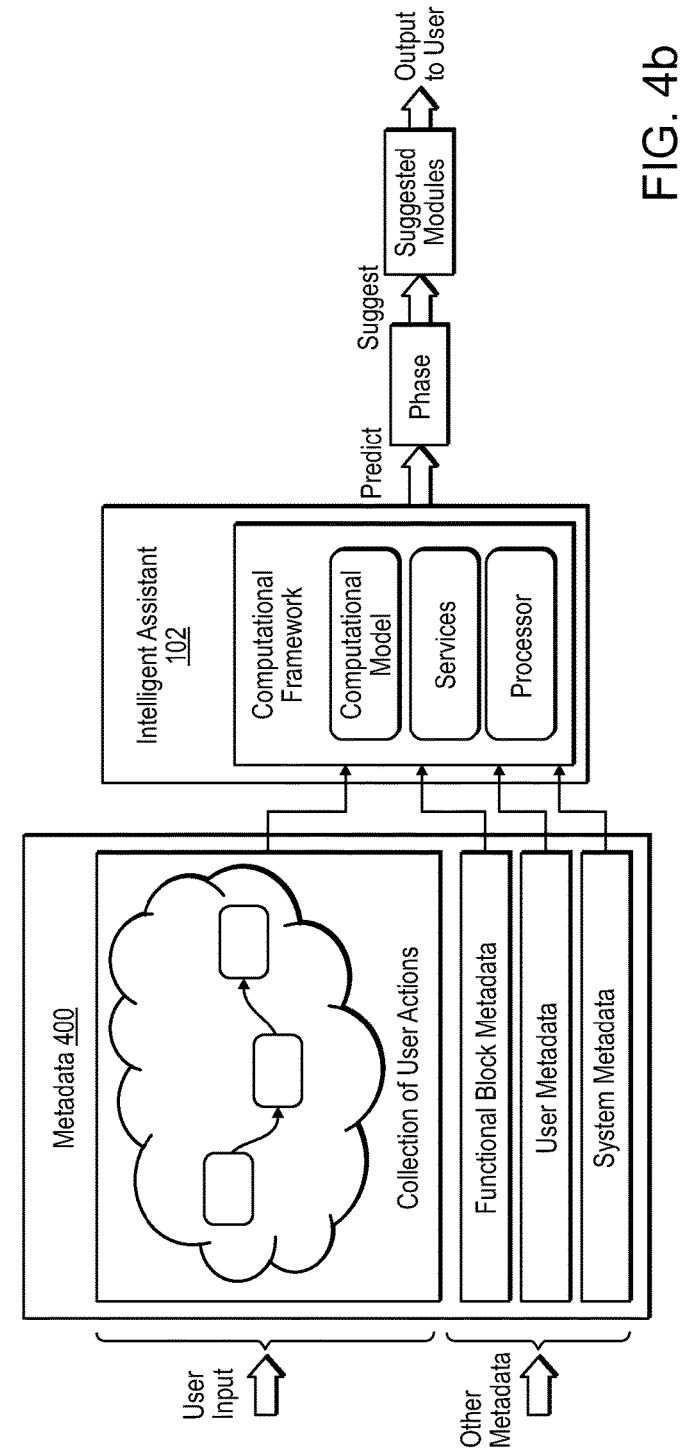
FIG. 4b is a block diagram of components of a system.

Referring again to FIG. 1a, and to FIGS. 4a and 4b, intelligent assistant 102 may observe the behavior of users, and assemble a statistical model 400 of users' past behavior. Intelligent assistant 102 may use information 400 to infer what the user will likely want to do next, to sharpen its recommendations:

If the inputs to and outputs from functional blocks are strongly typed, intelligent assistant 102 can infer that a functional block with a specific output type is likely to be followed by a functional block with the same (or a compatible) input type, and that inputs and outputs of like type are more likely to be connected. For example, in a strongly-typed system, outputs of type "integer" can be fed into another functional block's input of type "integer." In some systems, data types can be converted; for example an output of type "integer" can be converted to type "string."

Intelligent assistant 102 may have access to a library of past analytical workflows developed by the same user, or by users in the same organization, or by all users, analyzed and stored in summary form by a manufacturer of intelligent assistant 102. Analytical workflows may be stored in the form of statistical and anonymized summaries to avoid disclosing trade secrets across organizations.

An analysis of specific actions of this user, or other users, so that intelligent assistant 102 has context information about the specific situations that arise, and how users tend to act in those situations.

The current phase being worked on—intelligent assistant 102 will infer a phase from the user's last actions, and favor block templates 112 from the inferred phase.

Intelligent assistant 102 may derive its suggestions based on user actions (e.g., what functional blocks have been selected in the workflow already), profile of past uses of the block templates 112, and understanding of the data sources and types. As a user builds an analytical workflow, intelligent assistant 102 may automatically infer the user's likely next step, and assist the user by presenting the highest-probability next steps to the user in a more-convenient short list (while keeping the full palette of available block templates 112 available in the long list form). Information 400 gathered by intelligent assistant 102 and used to infer recommendations may include:

1. Metadata 410 describing the properties of the block templates 112 and functional blocks, including:
   The phase to which this block template 112 belongs.
   Data type information about each input to and output from the block template 112.
   Information on what other block templates 112 this functional block is most often linked to. This information may be gathered with respect to a single user, the user's organization, or worldwide from a large number of users of intelligent assistant 102, with various users weighted higher or lower, depending on how closely their use tracks this specific user.
   Functional properties, such as whether the block is in the general class of "extract," "compute," "transform" and the like.
2. User-action metadata 420 about this specific user's actions in building past analytical workflows, such as:
   Selection of specific block templates 112.
   Connecting edges added between functional blocks.
   Selection of functional block's input parameters, etc.
3. Other user metadata 430 describing properties of the user, such as:
   A user profile that is already linked to certain specific data sources.
4. Historical data 420, 430 about other users' actions, such as:
   The same data for these other users as collected for this specific user (from bullets 2 and 3).
   An indication of how related the other users may be to this user, or how similar their usage patterns are, so that history of users in the same organization can be weighted more highly than users from more-distantly related organizations.

5. System metadata such as:
   Information about analytical workflows, and therefore functional blocks used and connection information, that already exist in the system, if any.
   Information about the state of construction of a current analytical workflow, for example, which phase is currently under construction.
6. The set of user actions being performed in building the current analytical workflow.
7. During building of the analytical flow, the programming system may execute the current instance of the partial analytical workflow on selected test data; additional data may be gathered as input to intelligent assistant 102 based on the actual data that is being executed.

Intelligent assistant 102 assumes that past actions performed by the user are indicative of the user's future intention, and that predictions of future features can be derived based on the past sequence of actions to establish general patterns, the immediate past actions to establish where in those patterns the user currently is, and other a priori information (e.g., functional block's function, the data types of its inputs and outputs, etc.).

As a user proceeds to build the analytical workflow, intelligent assistant 102 may use information from profile information 400 listed above to infer which phase of the workflow is currently being built, and which block templates 112 and connections should be suggested to the user.

IV. Prediction Using Markov Models

Referring to FIG. 5a, one possible implementation of intelligent assistant 102 uses hidden Markov models (HMMs) to model user intent and predict next actions. User action information may be combined with a priori hardcoded rules that, for example, draw inferences based on the strong typing of the outputs and inputs of block templates 112 and functional blocks 212 instantiated from the templates. Techniques used in machine learning of human conversations (dialogues), where speakers' utterances constituting dialogue are related to actions, and the objective is to recognize the intention of the dialogue and speaker based on the subsequent actions, or perform some type of conversational analysis, may be adapted for use in intelligent assistant 102. These techniques are described in Z. Ghahramani, "An introduction to hidden Markov models and Bayesian networks," International Journal of Pattern Recognition and Artificial Intelligence, vol. 15, no. 1, pp. 9-42 (2001) and A. Stolcke et al., "Dialog act modeling for conversational speech," in Proc. of the AAAI Spring Symposium on Appl. Machine Learning to Discourse Processing, pp. 98-105 (1998), both of which are incorporated by reference. Rather than a sequence of dialog acts and dialogues, intelligent assistant 102 applies these techniques to a sequence of user actions and phases of an analytical workflow.

In one example implementation, intelligent assistant 102 uses a Markov model to track the build process. For example, each state 502 of the Markov model may correspond to one recommendation (or set of recommendations). Some states 502 of the Markov model may correspond to subsets of the block templates 112 (for example, menu 230 of FIG. 2c or menu 252 of FIG. 2e), and other states to the act of adding a dataflow edge between functional blocks that have been added to the analytical workflow (for example, edge 244 of FIG. 2d). Edges 504 between the Markov states may be weighted with probabilities that the user will take that edge to the next state. Intelligent assistant 102, as it executes Markov model 500, may offer up the recommendation corresponding to each state 502 transitioned-to, or corresponding to the states at the ends of the transition edges with the highest probability/probabilities.

In other implementations, the model may have relatively few states 502, and the phase and feature information may be used to subdivide actions to be taken as the model transitions to each new state. The recommendations may be based on a 3-tuple (state, phase, feature), and the association between particular block templates 112 and 3-tuples may be by means of machine learning, with little human intervention.

As the user builds an analytical workflow:
1. Intelligent assistant 102 cycles through Markov model 500 as the user takes each step (instantiating a functional block or adding a dataflow edge).
2. As a user begins each action of building the analytical workflow, intelligent assistant 102 uses current Markov model 500 and its current state to identify and recommend highest probability next actions. For example, if the highest probability edge (or edges) lead to Markov states that correspond to block templates 112, intelligent assistant 102 may recommend the block templates 112 at the most-probable destination Markov state (or the total set of block templates 112 corresponding to the several highest probability Markov states).
3. The user then selects an action, either from the short-listed suggestions inferred by intelligent assistant 102 or from the full palette of available block templates 112, or edges to be added, or other possible actions.
4. The programming system performs the selected action (by instantiating the new functional block into the analytical workflow, adding a dataflow edge between existing functional blocks, etc.)
5. Intelligent assistant 102 updates historical data 400 that annotates the Markov model.
6. Intelligent assistant 102 applies the user-selected action as an input to the Markov model to advance the Markov model to the next state dictated by the selected action.
7. The process continues at step 2.

IV.A. Example Markov Model

Referring to FIG. 5a, a Markov model may have states that correspond to recommended actions, and as the model is executed by system 100, as the model transitions to each state 502, intelligent assistant 102 may recommend the action associated with the transitioned-to Markov state 502. For example, each Markov state 502 may be associated with three to ten of the block templates 112, or a menu 230, 252 or a dataflow edge to be added 264. The division need not be a partition—that is, some block templates 112 may be associated with more than one Markov state 502. Some block templates 112 (rarely-used ones) may be assigned to no state at all (or to the phantom states 510 shown at the bottom of FIG. 5a), so that these block templates 112 can only be instantiated into an analytical workflow by being selected from the exhaustive library 110—they will never be recommended. In some cases, two or more transition 504 probabilities in the Markov model may have probabilities high enough (either close to each other, or each above a threshold) that intelligent assistant 102 may assume that the next transition may be to the two or more high probability Markov states 502, and intelligent assistant 102 may then recommend all of the block templates 112 associated with those two or more Markov states 502.

To assign block templates 112 to Markov states, the block templates 112 may be grouped by phase (the columns of FIG. 5a) and by feature table row (the rows of FIG. 5a). These groups may be further subdivided into subgroups. Each of these groups of block templates 112 may be associated with one state of the Markov model, so that when intelligent assistant's execution of the Markov model reaches that state, the block templates 112 associated with the state may be offered as the recommendation to the user. A finer division of the block templates 112 into more Markov states may improve the resolution and accuracy of the recommendations of intelligent assistant 102, but increase computational load.

In the general case, the transition edges 504 among the states of the Markov model may form a complete graph (that is, from any state, there is at least some nonzero probability of a transition to any other state, including a "loop" transition back to the same state), but in practice, most transition probabilities are zero or negligibly close to zero. For clarity, FIG. 5a shows only a few transition edges.

In some implementations, the prediction may proceed in two steps, first a prediction of a next phase based on the user's last action and metadata 400, and then a prediction of a next action based on the inferred phase in combination with the other metadata and user's last action.

Additional relationships between functional blocks that may be used to infer likely relationships are described in Kevin K. Nam et al., Advisory Services for User Computation Tools, Proceedings of the 2015 IEEE 9th International Conference on Semantic Computing (February 2015), incorporated by reference.

IV.B. Learn Sequences and Derive Patterns

Intelligent assistant 102 can learn and train a model based on sequences of features in the analytical workflow. Sequences are, for example:

"extract">"transform">"publish" or
"extract">"extract">"transform">"publish"

Intelligent assistant 102 may be able to derive patterns of features by combing rules-based approaches based on block template metadata 410 and system metadata 400 (e.g., based on strongly typed block templates 112 and functional blocks) and from historical profile 430 of the user and other recently built analytical workflows 420, if available. Intelligent assistant 102 may then consider a complete Analytical Workflow as a directed graph of Phases, with a Phase being a collection of User Actions. That is:

Phase=Collection of User Actions=$UA_1, UA_2, \ldots, UA_N$
where UA is in the feature set determined in section III.B.

Intelligent assistant 102 may segment the building of the analytical workflow into phases (see section III.A), through the use of the functional block metadata 410 (a priori tagging of which phase a block template 112 belongs in) and user action metadata 420, 430. Intelligent assistant 102 may initially assume that construction of the analytical workflow will proceed sequentially left-to-right, as this is a natural approach to building a workflow.

Referring to FIGS. 5a and 5b, intelligent assistant 102 may then construct a model, for example, a hidden Markov model. This model of authoring a phase within an analytical workflow may use two parallel sequences of states, one observable and one hidden. Here, the observables are the User Actions, UA$i$, being "generated" by the state that the analytical workflow, or user, is in. In FIG. 5b, a Hidden Markov Model shows a sequence of User Actions that represent observations, flowing as a result of progression through states 502.

Hidden Markov Models for inferring meaning from a stream of tokens (for example a dialogue) are discussed in Boyer, Kristy Elizabeth, et al. "Inferring tutorial dialogue structure with hidden Markov modeling." Proceedings of the Fourth Workshop on Innovative Use of NLP for Building Educational Applications. Association for Computational Linguistics (2009), incorporated by reference. Following the methods outlined in the literature (for example, Lawrence R. Rabiner. "A tutorial on hidden Markov models and selected applications in speech recognition." Proceedings of the IEEE, pages 257-286 (1989), incorporated by reference), and adopting similar notation, a hidden Markov model may be defined as the 5-tuple S, O, A, B, it where:

S=$\{s_1, s_2, \ldots, s_N\}$ is a set of hidden states;
O=$\{o_1, o_2, \ldots, o_M\}$ is a finite set of observations, where an observation is a User Action mapped to the feature set defined above;
A, the State Transition Matrix, is an N×N matrix where $a_{ij}$ corresponds to the probability of transitioning from state $s_i$ to $s_j$;
B. the Observation Probability Matrix, is $\{b_1(k), \ldots, b_N(k)\}$ is a set of m-vectors where $b_i(k)$ is the probability of observing $o_k$ when in state $s_i$;
π is the initial hidden state distribution and is an N-vector where η(i) specifies the probability that the system is initially in state $s_i$.

Further, as inputs to algorithms for analyzing a system and fitting a Markov model to the behavior of that system, further parameters may include:

N=number of hidden states in the model;
M=number of distinct observations.

In implementations where model 500 is generated by automatic model-fitting techniques, the set of hidden states S can be thought of representing hidden states underlying the temporal process of generating analytical workflows. It is not necessary to have a known representation of S, but rather only the number of states N in the set S is needed to determine the remaining distributions of A, B, and π. N may be a parameter that is determined based on trial and error. For example, intelligent assistant 102 may begin with N=2 and look at the likelihood of each model. The likelihood generally increases with N before plateauing, and intelligent assistant 102 may choose the smallest N for which further increase in likelihood is negligible. The distributions of A, B, and π is calculated a priori and trained based on system metadata (e.g., other analytical workflows and what functional blocks are used and how) and are iteratively learned. The complete parameter set of the model can be represented as λ=(A, B, π).

IV.C. Computational Framework

Given a Markov model k, what is the probability of the sequence O=$\{o_1, o_2, \ldots, o_M\}$. This, in turn, can be thought of, as: Given a sequence of the most-recent observations $\{o_1, o_2, \ldots, o_M\}$, what is the probability of the next observation to be $o_{M+1}$. Another framing of a Markov model analysis asks, given a sequence of observations $\{o_1, o_2, \ldots o_M\}$, what is the most likely sequence of states $\{s_1, s_2, \ldots, s_M\}$, and from that, what is the most likely next state $s_{M+1}$, and from that $s_{M+1}$, what is the most likely next observation $o_{M+1}$? In intelligent assistant 102, the sequence of $\{o_1, o_2, \ldots, o_M\}$ are the observed user-actions previously made, and $o_{M+1}$ can be one of (or a small set from among) many allowed user actions, which will be the predicted/suggested next action presented by intelligent assistant 102. Intelligent assistant 102 may compute the probability $P(O|\lambda_i)$ for all allowed $o_{M+1}$ and present the user with one or more $o_{M+1}$ as the recommendations, based on the rankings of the computed probabilities $P(O|\lambda_i)$. Specifically, we define a set of models $\lambda_i$ for each of the phases of the analytical workflow. We therefore, compute, at each step, $P(O|\lambda_i)$, for i in the set of phases {ingest, cleanse, fuse, analyze, report}. This further allows us to decrease the number of states and observables (N, M), and provide the user, as a recommendation, the observable with the highest $P(O|\lambda_i)$, in effect inferring the phase {ingest, cleanse, fuse, analyze, report} that the user is currently in.

To calculate $P(O|\lambda_i)$ in a computationally reasonable manner, we use the Forward-Backward algorithm (for example, as described in Lawrence R. Rabiner. "A tutorial on hidden Markov models and selected applications in speech recognition." Proceedings of the IEEE, pages 257-286 (1989)), which allows us to compute $P(O|\lambda)$ as the sum, from 0 to N−1, over α, the probability of the partial observation sequence. Symbolically, this is:

$$P(O|\lambda_i) = \Sigma_{i=0,N-1} \alpha_M(i)$$

These partial observation sequence probabilities can be computed directly from B and π, recursively, with the initial value equal to $\alpha_1(i) = \pi_i b_i(o_1)$.

In order to begin the above computation, model λ=(A, B, π) may be computed automatically. With fixed N and M, we iteratively learn A, B and π through an expectation-maximization algorithm known as the Baum-Welch algorithm. We begin with initial probability estimates, e.g., randomized values near 1/N for A and π and 1/M for B. (The values of A should have perturbations away from exactly 1/N, which can be random.) Based on a training set of analytical workflows, a sequence of observations O may be used to estimate and refine the computed expectations of the model parameters.

In subsequent use of the programming system to build a new analytical workflow, intelligent assistant 102 observes the actions of the user, and maintains a state of the HMM. At each state, as the user begins to select a new block template 112 to instantiate a new functional block into the analytical workflow, intelligent assistant 102 assumes that the user is most likely to follow the highest-probability (or one of the several highest-probability) transitions out of the current state. That transition edge corresponds to one of the features of the feature set. The feature corresponds to a small number of block templates 112. Intelligent assistant 102 recommends that relatively-small set of block templates 112, and appropriate connections, in an easily-selected menu list (while the full palette of block templates 112 remain available for selection if the user rejects the recommended menu).

The user selects a block template 112 (from the short-list menu or from the full palette 110). The programming system instantiates a functional block 212 from the selected block template 112 into the analytical workflow.

Intelligent assistant 102 updates the state based on the actually-selected block template 112.

In some cases, the contributions for each analytical workflow can be weighted for its computation of estimated transition states. For example, analytical workflows that are more-recent may be over-weighted relative to older workflows. Analytical workflows may be weighted based on frequency of execution within the user's organization.

IV.D. Alternative Approaches

An alternative approach can be devised based on other machine learning algorithms (e.g., classification or clustering approaches).

For example, using an N-gram approach may allow intelligent assistant 102 to make a recommendation based on the assumption that, within a given phase of the analytical workflow, the most likely next user-action f (e.g., the recommendation to be made by intelligent assistant 102), is determined by the k preceding user-actions, with likelihood for the $n^{th}$ user-action given by $u_n = \text{argmax}_u P(u|u_{n-1}, \ldots, u_{n-k+1})$. These conditional probabilities can be learned from a training set of analytical workflows. One may also experiment with using a value of k=2 (bigrams) or k=3 (trigrams) or larger k values, based on the expected length and dependency within an analytical workflow, by looking at a training set.

Following a similar approach to N-grams, we can also consider using Bayes classifier, and look for maximum probability for a given user-action. But rather than looking at preceding user-actions, we can assume (in the case of a naïve Bayes classifier), that the given user-action is described by a set of fully independent features $f_1, f_2, \ldots f_n$.

Accurate recommendations may be generated with, for example, hidden Markov model (HMM), a finite state machine (FSM), a neural network (NN), a deep neural network (DNN), support vector machines, or other machine learning models.

V. Hardware Implementation

Any of the various processes described herein may be implemented by appropriately programmed general purpose computers, special purpose computers, and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in one or more computer programs, one or more scripts, or in other forms. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

Programs and data may be stored in various media appropriate to the purpose, or a combination of heterogenous media that may be read and/or written by a computer, a processor or a like device. The media may include non-volatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

Databases may be implemented using database management systems or ad hoc memory organization schemes. Alternative database structures to those described may be readily employed. Databases may be stored locally or remotely from a device which accesses data in such a database.

In some cases, the processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

The invention claimed is:

1. A method comprising the steps of:
as users of a programming system use the programming system to create programs, storing into a computer memory data describing actions of the users in creating the programs, the programming system having a graphical user interface and a library of templates for functions, the graphical user interface presenting to users functions depicted as templates of blocks to be selected for incorporation into programs, the graphical user interface being programmed to receive input from the users to direct the system to assemble functions from the library into the programs, the functions being functions for processing of data, the graphical user interface depicting the incorporated functions as graphical elements for manipulation in the graphical user interface, the graphical user interface presenting an ability to graphically connect data output connection points of incorporated function graphical elements to input connection points of incorporated function graphical elements; and
as a user from among the users uses the graphical user interface to assemble a program, computing suggestions to the user for:
functions to be added into the program, the computation of function suggestion being based at least in part on weighted evaluation of the stored action data, stored action data of the user being weighted most heavily, stored action data of other users of the programming system being given lesser weight; and
user data flow paths to be added to connect an output of one function to an input of another function, the computation of data flow suggestions being based at least in part on the stored actions.

2. The method of claim 1, further comprising the step of:
computing the function suggestion based at least in part on a model automatically generated by a machine learning algorithm.

3. The method of claim 2, wherein:
the machine learning algorithm is a Markov model.

4. The method of claim 2, wherein:
the machine learning algorithm is an n-gram method.

5. The method of claim 1:
wherein the function templates of the library specify inputs and outputs, the inputs and outputs being strongly typed; and
further comprising the step of computing the function suggestions based at least in part on the types of inputs and/or outputs of the functions in the program.

6. The method of claim 1, wherein:
the functions of the library are classified into phases, the phases corresponding to sequential operational phases of programs, the suggestions being based at least in part on the respective phase classifications.

7. The method of claim 1, wherein:
the graphical user interface is a graphical user interface programmed to show the program's functions as blocks.

8. The method of claim 1, further comprising the step of:
as the user assembles functions from the library into a program, executing a partially-assembled program on input data; and
computing suggestions to the user for functions to be added into the program based at least in part on the execution of the partially-assembled program.

9. A method of comprising the steps of:
as users of a programming system use the programming system to create programs, storing into a computer memory data describing actions of the users in creating the programs, the programming system having a graphical user interface and a library of templates for functions, the graphical user interface presenting to users functions depicted as templates of blocks to be selected for incorporation into programs, the graphical user interface being programmed to receive input from the users to direct the system to assemble functions from the library into the programs, the functions being functions for processing of data, the graphical user interface depicting the incorporated functions as graphical elements for manipulation in the graphical user interface, the graphical user interface presenting an ability to graphically connect data output connection points of incorporated function graphical elements to input connection points of incorporated function graphical elements; and
as a user from among the users assembles functions from the library into a program, executing a partially-assembled program on input data; and
computing suggestions to the user for functions to be added into the program, the computation of function suggestion being based at least in part on the execution of the partially-assembled program, and on weighted evaluation of the stored action data, stored action data of the user being weighted most heavily, stored action data of other users of the programming system being given lesser weight.

10. The method of claim 8, further comprising the step of:
as the user uses the graphical user interface to assemble a program, computing suggestions to the user for user data flow paths to be added to connect an output of one function to an input of another function, the computation of data flow suggestions being based at least in part on the stored actions.

11. The method of claim 8, further comprising the step of:
computing the function suggestion based at least in part on a model automatically generated by a machine learning algorithm.

12. The method of claim 11, wherein:
the machine learning algorithm is a Markov model.

13. The method of claim 11, wherein:
the machine learning algorithm is an n-gram method.

14. The method of claim 8:
wherein the function templates of the library specify inputs and outputs, the inputs and outputs being strongly typed; and
further comprising the step of computing the function suggestions based at least in part on the types of inputs and/or outputs of the functions in the program.

15. The method of claim 8, wherein:
the functions of the library are classified into phases, the phases corresponding to sequential operational phases of programs, the suggestions being based at least in part on the respective phase classifications.

16. The method of claim 8, wherein:
the graphical user interface is a graphical user interface programmed to show the program's functions as blocks.

17. A computer, comprising:
a processor designed to execute instructions from a memory;
a nontransitory memory having stored therein instructions to cause the processor:
as users of a programming system use the programming system to create programs, to store into a computer memory data describing actions of the users in creating the programs, the programming system having a graphical user interface and a library of templates for functions, the graphical user interface presenting to users functions depicted as templates of blocks to be selected for incorporation into programs, the graphical user interface being programmed to receive input from the users to direct the system to assemble functions from the set into the programs, the functions being functions for processing of data, the graphical user interface depicting the incorporated functions as graphical elements for manipulation in the graphical user interface, the graphical user interface presenting an ability to graphically connect data output connection points of incorporated function graphical elements to input connection points of incorporated function graphical elements; and
as a user of the programming system uses the graphical user interface to
assemble a program, compute suggestions to the user for:
functions to be added into the program, the computation of function suggestion being based at least in part on weighted evaluation of the stored action data, stored action data of the user being weighted most heavily, stored action data of other users of the programming system being given lesser weight; and
data flow paths to be added to connect an output of one function to an input of another function, the computation of data flow suggestions being based at least in part on the stored actions.

18. The computer of claim 17, the instructions being further programmed to cause the computer to:
compute the function suggestion based at least in part on a model automatically generated by a machine learning algorithm.

19. The computer of claim 18, wherein:
the machine learning algorithm is a Markov model.

20. The computer of claim 18, wherein:
the machine learning algorithm is an n-gram method.

21. The computer of claim 17, wherein:
the machine learning algorithm is trained via programs built by multiple users.

22. The computer of claim 17:
wherein the function templates of the library specify inputs and outputs, the inputs and outputs being strongly typed; and
the instructions being further programmed to cause the computer to computing the function suggestions based at least in part on the types of inputs and/or outputs of the functions in the program.

23. The computer of claim 17, wherein:
the functions of the library are classified into phases, the phases corresponding to sequential operational phases of programs, the suggestions being based at least in part on the respective phase classifications.

24. The computer of claim 17, wherein:
the graphical user interface is a graphical user interface programmed to show the program's functions as blocks.

25. The computer of claim 17, the instructions being further programmed to cause the computer to:
as the user uses the graphical user interface to assemble a program, to execute a partially-assembled program on input data; and
compute suggestions to the user for functions to be added into the program based at least in part on the execution of the partially-assembled program.

26. A computer, comprising:
a processor designed to execute instructions from a memory;
a nontransitory memory having stored therein instructions to cause the processor:
as users of a programming system use the programming system to create programs, to store into a computer memory data describing actions of the users in creating the programs, the programming system having a graphical user interface and a library of templates for functions, the graphical user interface presenting to users functions depicted as templates of blocks to be selected for incorporation into programs, the graphical user interface being programmed to receive input from the users to direct the system to assemble functions from the set into the programs, the functions being functions for processing of data, the graphical user interface depicting the incorporated functions as graphical elements for manipulation in the graphical user interface, the graphical user interface presenting an ability to graphically connect data output connection points of incorporated function graphical elements to input connection points of incorporated function graphical elements; and
as a user of the programming system uses the graphical user interface to assemble a program, to:
execute a partially-assembled program on input data;
compute suggestions to the user for functions to be added into the program, the computation of function suggestion being based at least in part on:

weighted evaluation of the stored action data, stored action data of the user being weighted most heavily, stored action data of other users of the programming system being given lesser weight; and the execution of the partially-assembled program.

27. The computer of claim 26, the instructions being further programmed to cause the computer to:
as the user uses the graphical user interface to assemble a program, compute suggestions to the user for user data flow paths to be added to connect an output of one function to an input of another function, the computation of data flow suggestions being based at least in part on the stored actions.

28. The computer of claim 26, the instructions being further programmed to cause the computer to:
compute the function suggestion based at least in part on a model automatically generated by a machine learning algorithm.

29. The computer of claim 28, wherein:
the machine learning algorithm is a Markov model.

30. The computer of claim 28, wherein:
the machine learning algorithm is an n-gram method.

31. The computer of claim 26, wherein:
the machine learning algorithm is trained via programs built by multiple users.

32. The computer of claim 26:
wherein the function templates of the library specify inputs and outputs, the inputs and outputs being strongly typed; and
the instructions being further programmed to cause the computer to computing the function suggestions based at least in part on the types of inputs and/or outputs of the functions in the program.

33. The computer of claim 26, wherein:
the functions of the library are classified into phases, the phases corresponding to sequential operational phases of programs, the suggestions being based at least in part on the respective phase classifications.

34. The computer of claim 26, wherein:
the graphical user interface is a graphical user interface programmed to show the program's functions as blocks.

* * * * *